United States Patent [19]

Irazoqui et al.

[11] 4,226,503
[45] Oct. 7, 1980

[54] BLOOD BANK MICROSCOPES WITH OSCILLATING VESSEL SUPPORT MEANS

[75] Inventors: Carlos A. Irazoqui, New York; Emil A. Scordato, Bronxville, both of N.Y.

[73] Assignee: Medical Laboratory Automation, Inc., Mount Vernon, N.Y.

[21] Appl. No.: 947,631

[22] Filed: Oct. 2, 1978

[51] Int. Cl.² .......................... G02B 21/24; G02B 7/04
[52] U.S. Cl. ...................................... 350/87; 350/39; 350/46; 356/246; 73/64.1
[58] Field of Search .............................. 350/95, 86–90, 350/82, 46, 47; 356/246, 84, 39, 50; 73/64.1

[56] References Cited

U.S. PATENT DOCUMENTS

| | | | |
|---|---|---|---|
| 3,135,817 | 6/1964 | Wigglesworth et al. | 350/84 |
| 3,738,730 | 6/1973 | Binnings et al. | 350/90 |
| 3,777,283 | 12/1973 | Elkins | 350/95 |
| 3,905,772 | 9/1975 | Hartnett et al. | 23/230 B |

FOREIGN PATENT DOCUMENTS

| | | | |
|---|---|---|---|
| 2754498 | 6/1978 | Fed. Rep. of Germany | 350/95 |
| 359335 | 2/1962 | Switzerland | 350/86 |

Primary Examiner—Jon W. Henry
Attorney, Agent, or Firm—William P. Keegan

[57] ABSTRACT

A blood bank microscope in which cell/serum-reagent reactions can be viewed, from below, directly in the cuvettes in which the reactions take place and in which the cuvettes can be rocked to cause the contents thereof to flow back and forth within the viewer's field of observation.

9 Claims, 8 Drawing Figures

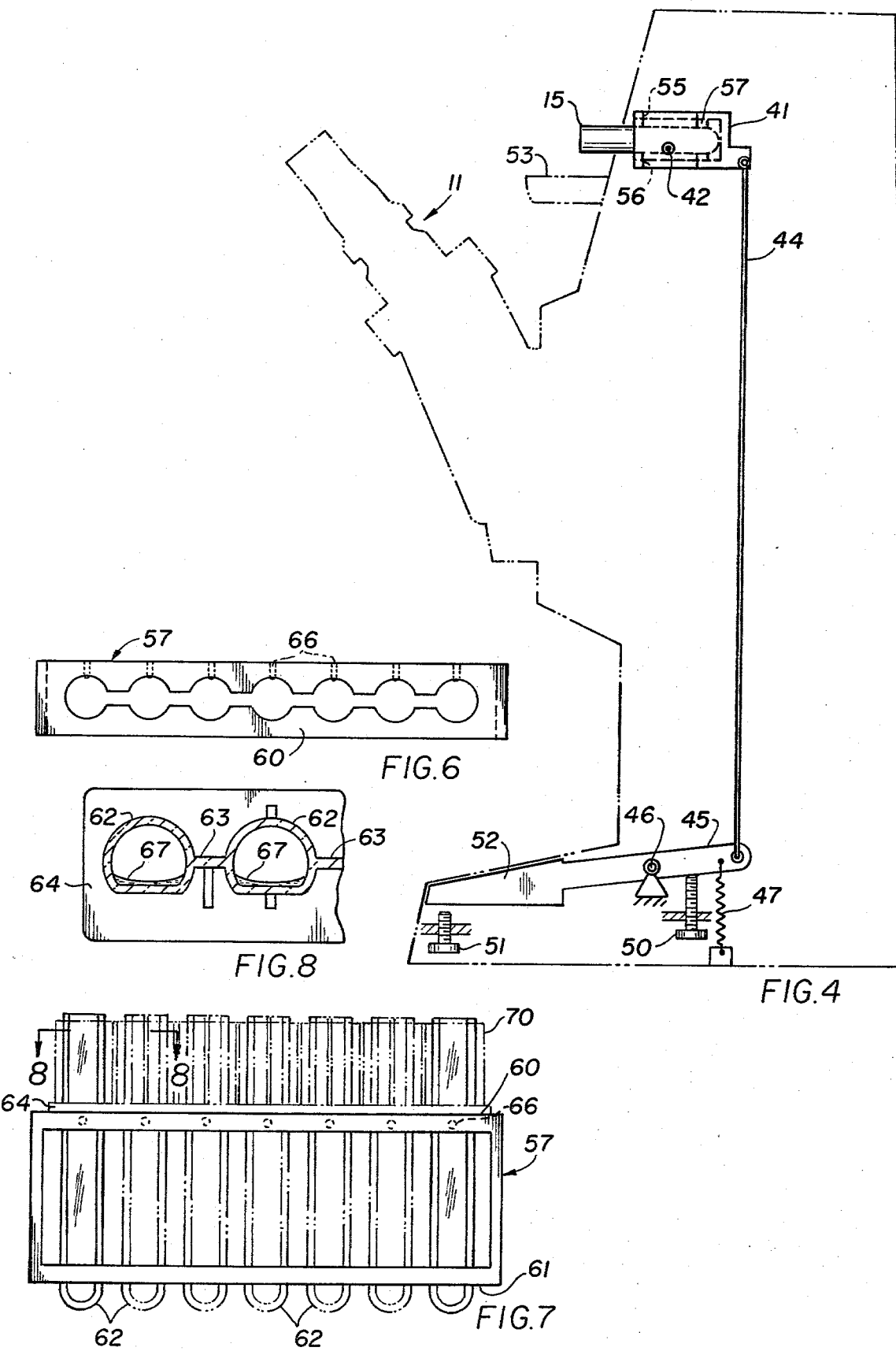

BLOOD BANK MICROSCOPES WITH OSCILLATING VESSEL SUPPORT MEANS

FIELD OF THE INVENTION

The invention relates to microscopes, and more particularly to microscopes suitable for use in blood banks or other laboratories where tests are performed to determine the presence or absence of cell agglutination reactions.

BACKGROUND OF THE INVENTION

Cell agglutination tests are performed routinely in the usual blood typing procedure for determining a patient's or donor's blood type according to the ABO classification system. In carrying out blood group identification tests, it is common to take a sample of blood from an individual and separate the blood into its component parts, i.e., red cells and serum. The cells are thoroughly washed in a saline solution and then placed, for example, in two cuvettes or other reaction vessels. One cell sample is mixed with a reagent of type A specific antibodies, otherwise known as type A antiserum or simply anti-A and the second with a reagent of anti-B. If the first cell sample agglutinates while the second does not, the individual's blood group is type A. If the reverse result obtains, then the individual's blood group is type B, while if agglutination takes place in both samples, the blood group is type AB. If agglutination is absent in both samples the blood group is type O.

The reason for blood typing is that the red blood cells of different individuals may have different antigens, or in other words, a different chemical structure on the surface of the cells. If, in transfusing blood to a patient, the donor's red blood cells had antigens different than those of the patient, the introduction of the donor's blood into the patient's blood stream would immediately stimulate the production of antibodies that would destroy the transfused blood cells and thereby vitiate the intended results of the transfusion. On the other hand, if the red cells of both a prospective donor and the patient have the same antigens, their bloods would be compatible and a safe transfusion could be effected.

It is so important to make a correct determination of an individual's blood type when a blood transfusion is contemplated or may become necessary that a double check, or reverse grouping, is ordinarily made in the typing procedure. Thus, in addition to observing if there is an agglutination reaction when the individual's red blood cells are mixed with antibody reagents, the individual's serum is mixed with standard red cells having known A antigens and B antigens. If the serum tests positively, i.e., agglutinates, with the A antigen cells and negatively with the B antigen cells, then the individual's blood group is type B. If the reverse result is observed, the blood group is type A, and if the results of both tests are negative, I.E., no agglutination, the blood group is type AB. If both tests are positive, the blood group is type O.

Another important test is the determination of whether or not a person's red blood cells have an Rh antigen. This antigen, like the others referred to, is important in determining compatibility of a donor's and recipient's blood when a transfusion is contemplated, but it is especially important in pregnancy where an Rh negative mother who developed Rh antibodies during a previous pregnancy may transfer those antibodies to a fetus having Rh positive blood and thereby effect the continuous destruction of the fetal blood cells. Prior knowledge of the patient's Rh condition enables preventive or compensatory measures to be taken. Other tests can be performed using other reagents to detect other red blood cell antigens should such further analysis be indicated.

The efficacy of the tests alluded to above is dependant on the ability of the technologist to observe the presence or absence of an agglutination reaction. Usually the initial determination is made by a direct unaided visual observation of the cell/serum-reagent mixture in the reaction vessel. A negative reaction, i.e., the absence of an agglutination product, is confirmed by studying the mixture under a microscope to assure that not even a weak agglutination occurred. Heretofore, the microscopic observation was made by pouring some of the cell/serum-reagent mixture onto a glass slide and observing the mixture under a microscope for some evidence of agglutination. It is obvious that a determination of a negative result when in fact there has been a weak agglutination result can lead to an erroneous conclusion as to the blood group type or at least to a discrepancy between the red cell group test and the reverse group test which would require re-performing the procedure to confirm or correct the initial results. In either event, the importance of accurately observing weak agglutination results is manifest.

BRIEF DESCRIPTION OF THE INVENTION

Accordingly, it is an object of the present invention to provide an improved apparatus for observing chemical reaction products, especially those resulting from blood group typing tests.

It is another object of the invention to provide an improved microscope for observing agglutination reactions in the reaction vessel.

It is still another object of the invention to provide an improved microscope in which the technologist can swirl or flow the liquid contents of a reaction vessel while observing the same for a reaction product.

It is still another object of the invention to provide an improved reaction vessel for performing blood group tests.

It is yet another object of the invention to provide an improved microscope that can accept multiple reaction vessels which can be indexed past an observation station for sequential observation of reaction products.

In carrying out the invention, a microscope is provided having means for holding a reaction vessel, i.e., a cuvette horizontally disposed with its longitudinal axis transverse to the optical axis of the microscope, substantially in the focal plane of the microscope, and means for tilting said holding means so as to cause the contents of the reaction vessel to flow back and forth along the focal plane. The reaction vessel holding means preferably accommodates an integral multi-cuvette comprising several reaction vessels and a movable member whereby each individual cuvette can be brought into the viewing station of the microscope.

A feature of the invention is that it enables the liquid mixture to be observed directly in the reaction vessel thereby obviating the necessity of transferring the mixture to a microscope slide and the need for a slide.

Another feature of the invention is that it enables a technologist to observe the entire contents of a cuvette rather than the single layer of a liquid that would be present on a conventional microscope slide thereby facilitating the observation of weak positive reactions.

Still another feature of the invention is that it retains the sample indentification of the labeled cuvette and obviates the need to label a microscope slide to assure positive sample identification.

Other features and advantages of the invention may be gained from the foregoing and from the following description of a preferred embodiment of the invention.

BRIEF DESCRIPTION OF THE DRAWING

In the drawing:

FIG. 4 is a side view showing the mechanism for rocking the reaction vessels;

FIG. 6 is a front view of the sliding carrier that accommodates a plurality of reaction vessels;

FIG. 7 is a bottom view showing a reaction vessel cassette in the sliding carrier; and FIG. 8 is an enlarged sectional view taken along line 8—8 of FIG. 7.

DETAILED DESCRIPTION OF THE INVENTION

Figure 1:
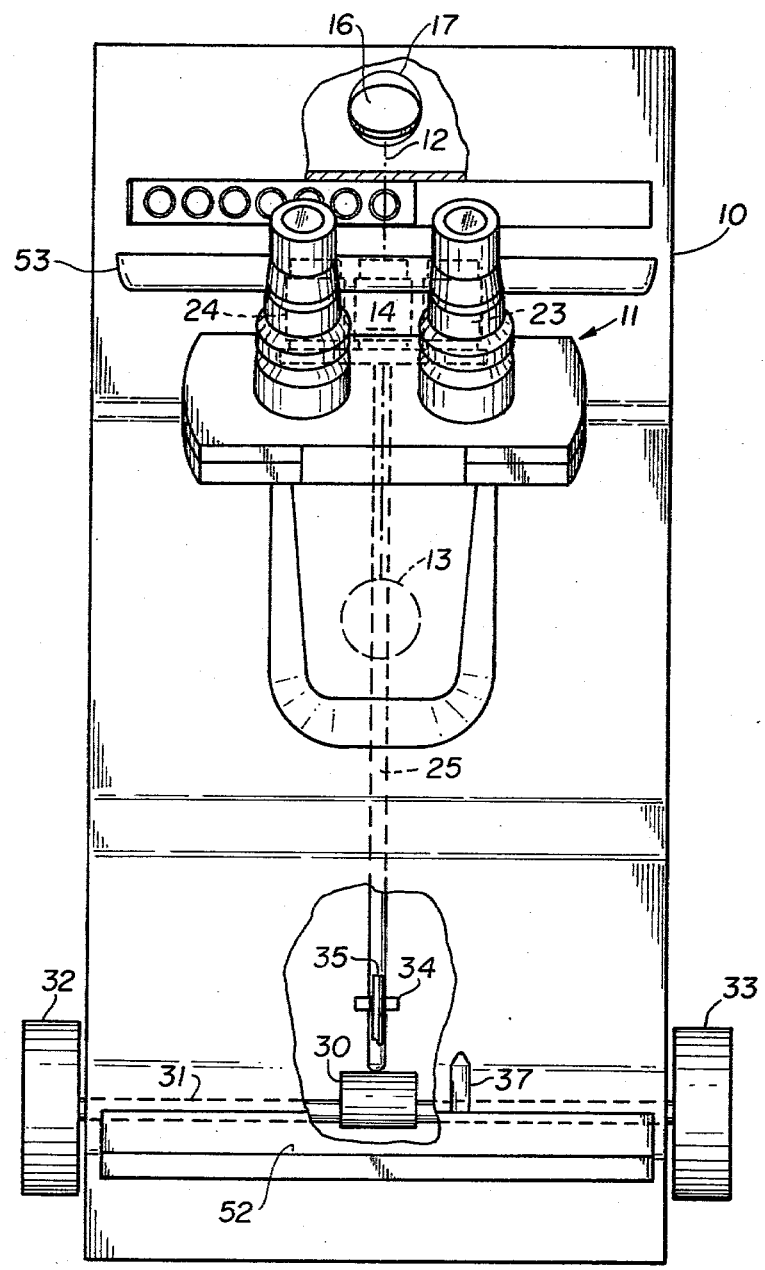
FIG. 1 is a front elevational view of a blood bank microscope embodying the present invention.
Figure 2:
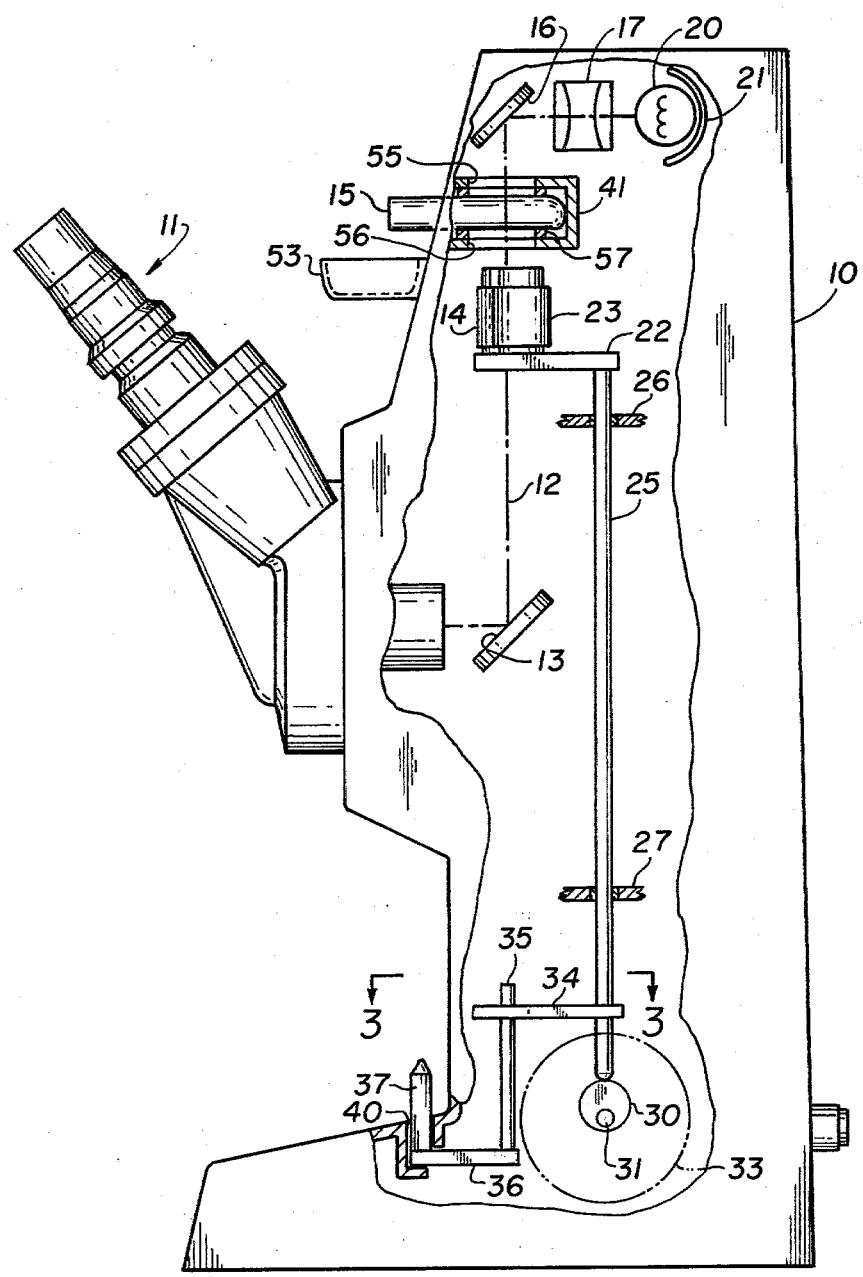
FIG. 2 is a side elevational view, partly in section, showing the blood bank microscope of FIG. 1.
Figure 3:
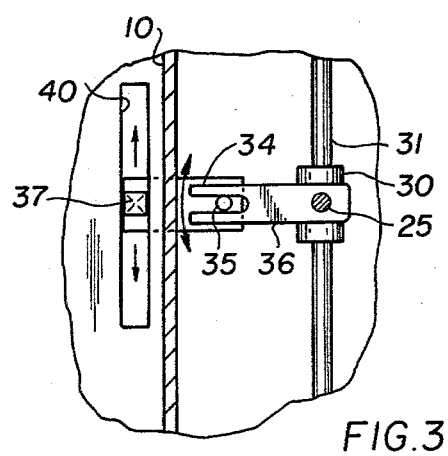
FIG. 3 is a fragmental view taken along line 3—3 of FIG. 2.

Reference is now made to FIGS. 1 and 2 wherein the blood bank microscope embodying the present invention is shown to include a housing 10 having an externally mounted binocular eyepiece 11. Of course, a microscope having a single eyepiece could be provided. The optics per se are conventional and hence only the general outline of the eyepiece mounting is illustrated. In FIG. 2 the optical axis 12 is shown being turned 90 degrees by a mirror 13, extending through an objective lens 14, through a reaction vessel 15, turned 90 degrees by a second mirror 16, passing through a condenser lens 17 to a light source 20. A reflector 21 is provided behind the light source. It will be noted particularly that when the cell/serum-reagent mixture in reaction vessel is illuminated for observation, the light passes through the top of the vessel and the mixture is observed from below. A control (not shown) is provided for controlling the intensity of illumination.

The objective lens 14 is supported on a lens platform 22 which may also support additional objective lenses 23 and 24 of different magnifying power. The lens platform 22 is itself supporton rod 25 which is guided in bearing guides 26 and 27. The microscope may be focused by moving lens 14 along optical axis 12 and this is accomplished by raising and lowering rod 25. An eccentric cam 30 is keyed to a spindle 31 which extends outside housing 10 to focusing knobs 32 and 33 which, when they are rotated, rotate cam 30 to raise or lower rod 25. Rod 25 may also be oscillated to pivot lens platform 22 and bring a selected one of objective lenses 14, 23, 24 into position on the optical axis of the microscope. A yoke 34, fastened to rod 25, engages a pin 35 carried by the bracket 36. The bracket, in turn, is connected to a magnification selector handle 37 which extends through a slot 40 in housing 10 and can readily be reciprocated to oscillate rod 25 and pivot lens platform 22 to bring the desired objective lens into operative position.

Attention is now directed to FIG. 4 wherein the mechanism for rocking the reaction vessel to cause the liquid mixture therein to flow back and forth along the focal plane of the microscope thereby facilitating observation of reaction products in the cell/serum-reagent mixture. The reaction vessel 15 is placed in a rocking frame 41 which is pivotally supported in housing 10 by pivot pins 42 and 43. A line drawn between the two pivot pins intersects the optical axis 12 of the microscope and is aligned about one millimeter above the lower inside surface of the reaction vessel placed in rocking frame 41. In this way, the microscope will be focused on the fluid layer in the reaction vessel as it flows back and forth when the vessel is rocked. A rod 44 connects frame 41 to lever 45. The lever 45 is pivotted at 46 and is urged by a spring 47 against the stop 50. This stop maintains the reaction vessel 15 in a slightly upwardly inclined position. A second stop 51 limits the downwardly tilted position of the reaction vessel when the technologist depresses tilting bar 52. The two stops are adjusted to allow sufficient forward and backward tilting of the reaction vessel to cause the liquid therein to flow back and forth past the observation point of the microscope. Surface tension of the liquid, and the limited volume thereof used in the tests, is usually sufficient to prevent spilling of the contents of the reaction vessel when the latter is tilted forwardly. However, a shelf 53 for holding a disposable receptacle may be provided for reassuring the technologist that any inadvertent spillage will be contained.

The apparatus so far described has made reference to a reaction vessel 15, and the apparatus could indeed be used with a single reaction vessel. However, in performing tests for determining blood groups, several tests are simultaneously conducted on the blood components from a single individual. Consequently, a multiple cavity reaction vessel, such as disclosed in U.S. Pat. No. 3,905,772, has considerable advantages over a plurality of separate test tubes or the like. Such a multiple cavity reaction vessel may be denominated a cuvette cassette, and it is designated 54 in FIG. 7. A cuvette cassette 54 enables all of the individual test samples to be conveniently kept together as a single physical unit. It further enables a single identification marking to suffice for all of the test cuvettes.

Therefore, the microscope embodying the present invention is further adapted to accept a cuvette cassette comprising a plurality of individual cuvettes joined to form an integral cassette. The number of cuvettes in a cassette may vary, but the present disclosure contemplates a seven unit cassette, and the microscope is adapted to accommodate this number of cuvettes. A cassette with fewer cuvettes could be used in the disclosed microscope or a microscope could be provided to accommodate a cassette of a greater number of cuvettes.

Figure 5:
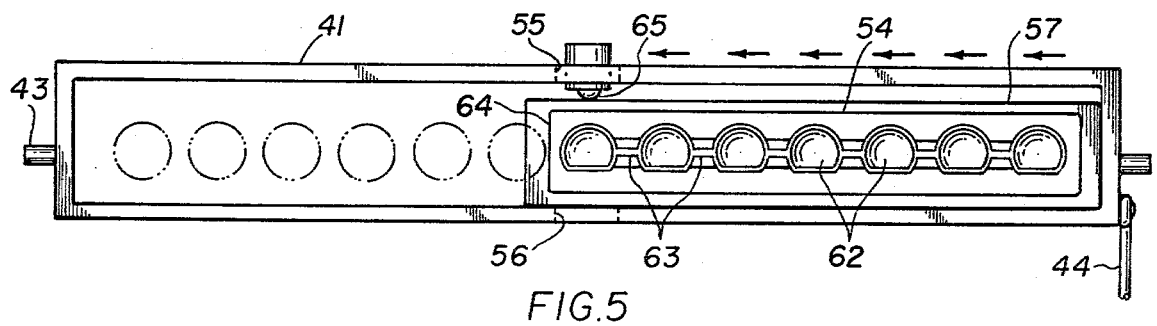
FIG. 5 is a front view of the rocking frame and sliding carrier that holds the reaction vessels.

Referring to FIG. 5, rocking frame 41 is seen to be an elongated front opened box which extends across the full width of the microscope and, in effect, determines the width of the microscope. The frame pivots in housing 10 as previously described. Apertures 55 and 56 are provided in the top and bottom surfaces of frame 41 so that the light from source 20 can illuminate a cuvette carried in frame 41. The frame is also provided with a sliding carrier 57 into which a cuvette cassette in inserted (See FIG. 7). Carrier 57 is simply a four walled member having appropriate cut-outs in the front 60 and rear 61 walls to accept the cuvettes of cassette 54. The individual cuvettes 62 are joined together by webs 63 to form a unitary member or cassette. A flange 64 on the cassette abuts the front wall 60 of carrier 57 and thereby positions the cassette in the carrier. A cuvette cassette without flange 64 could be provided, but then carrier 57 would be provided with a secondary rear wall against which the bottoms of the cuvettes would abut. If, as shown in FIG. 5, the carrier 57 is in the extreme rightward position in frame 41, the first cuvette will be in position on the optical axis of the microscope. A spring loaded detent 65 on frame 41 engages a depression 66 (FIG. 6) on carrier 57 to fix the position of the carrier and the cuvette carried thereby in the microscope. Similar depressions, along the top of front wall 60, aligned with the other cuvette positions serve to fix the carrier for observing the liquid mixtures in the other cuvettes in carrier 57.

The cuvette cassette 54 is similar to that disclosed in aforementioned U.S. Pat. No. 3,905,772 except that the present cuvettes are provided with a flattened side as shown in FIG. 8. This construction has been found to be very efficaceous when observing the liquid mixture from below as in the microscope disclosed since the mixture is viewed through a flat surface thereby minimizing image distortion. Also, it has been found that the liquid mixture 67 within the cuvette assumes the distribution pattern shown in FIG. 8 when the cuvette is made of polystyrene. The liquid distribution thus obtained when using a plastic cuvette 62 of the configuration disclosed results in a thinner layer of liquid that can be better observed for reaction products. A similar liquid distribution pattern was not observed in a similarly configured glass cuvette.

The cuvette cassette 54 may be provided with an indicia member 70 of the type disclosed in aforementioned U.S. Pat. No. 3,905,772. Such an indicia member indicates the test being conducted in each cuvette, thereby minimizing the liklihood for a technologist to assign a positive or negative reaction with the wrong cell/serum-reagent test.

In use, a technologist would prepare the usual cell-/serum-reagent mixtures in the several cuvettes of cassette 54 and, after performing the necessary procedures, e.g., centifugation, would observe each cuvette for agglutination. If a positive reaction is not observed in a cuvette, that cell/serum-reagent mixture must be studied under a microscope to determine if there was, in fact, no agglutination, or if there was a weak reaction that was not detectable with the naked eye. The cuvette cassette 54 would then be placed in carrier 57 and the carrier positioned to bring the cuvette containing the questionable reaction onto the toptical axis 12 of the microscope. Knob 32 or 33 would be rotated to bring the liquid in the cuvette into the focal plane of objective lens 14. The technologist would then depress and release tilting bar 52 to rock frame 41 and cause the liquid in the cuvette to flow back and forth thus facilitating the observation of weak agglutinations. If agglutination is not detected, the technologist may elect to bring a lens having a greater magnifying power into use. This is done by moving handle 37 to bring lens 23 or 24 into position along axis 12. The procedure outlined above is repeated and the cell/serum-reagent mixture in the cuvette is again studied for agglutination.

Having thus described the invention, it is clear that what may appear to be different embodiments thereof could be provided without departing from the spirit and scope of the invention. Hence it is intended that the foregoing specification and the drawing be interpreted as illustrative rather than in a limiting sense.

What is claimed is:

1. A reverse microscope for viewing a fluid specimen through the fluid supporting surface of a specimen vessel, said microscope comprising, pivotally mounted means adapted to support a specimen vessel in the focal plane of the microscope optics, means located relative to said vessel support means for illuminating from above a fluid specimen supported by said vessel support means, optical means adapted to be focused on a fluid specimen supported by said vessel support means for viewing the specimen from below, and means for oscillating said vessel support means to cause a fluid specimen in a specimen vessel to flow back and forth through the focal point of the microscope optics.

2. A microscope according to claim 1 wherein said oscillating means comprises spring means connected to said vessel support means for biasing said vessel support means to a first position, and lever means connected to said vessel support means for tilting said vessel support means against the action of said spring means.

3. A microscope according to claim 1 wherein said vessel support means is adapted to accommodate a plurality of specimen vessels in side by side relationship, and including means for indexing the plurality of specimen vessels as a group so as to bring individual specimen vessels seriatim into the field of view of the microscope optics.

4. A microscope according to claim 3 wherein the vessel support means is adapted to accommodate a plurality of linearly arrayed specimen vessels, and said indexing means includes a slide member carried by said vessel support means into which the specimen vessels are placed and which can be stepped linearly relative to said object station means.

5. A microscope according to claim 1 including focusing means for adjusting the position of the focal point of the optical means to coincide with a selected point in a specimen held in the vessel support means.

6. A microscope according to claim 5 wherein said optical means includes a plurality of objective lenses, each adapted to be focused at the vessel support means, and selector means for moving a selected one of said objective lenses into operative position on the optical axis of the microscope.

7. The combination of a microscope according to claim 1 and a specimen vessel comprising an elongated cuvette having a flat side, and wherein said vessel support means is adapted to hold said cuvette in a substantially horizontal position such that the contents thereof lie on the flat side of the cuvette when the cuvette is placed in the vessel support means, whereby a thin layer of fluid is viewed from below through the flat side of the cuvette.

8. The combination of a microscope according to claim 3 and a plurality of specimen vessels, each comprising an elongated cuvette having a flat side.

9. The combination according to claim 8 wherein the plurality of cuvettes are joined together to form a cuvette cassette.

* * * * *